United States Patent [19]
Aubert et al.

[11] 4,081,325
[45] Mar. 28, 1978

[54] INTERNAL STRUCTURE FOR A NUCLEAR REACTOR VESSEL

[75] Inventors: Roger Aubert, Orsay; Jacques Baujat, Versailles, both of France

[73] Assignee: Commissariat a l'Energie Atomique, Paris, France

[21] Appl. No.: 724,261

[22] Filed: Sep. 17, 1976

[30] Foreign Application Priority Data

Oct. 2, 1975 France .................................. 75 30246

[51] Int. Cl.² .............................................. G21C 17/08
[52] U.S. Cl. .................................. 176/87; 176/19 EC
[58] Field of Search .................. 176/87, 19 R, 19 EC, 176/30-32

[56] References Cited
U.S. PATENT DOCUMENTS

| | | | |
|---|---|---|---|
| 3,664,922 | 5/1972 | Diwinsky et al. ................. | 176/19 R |
| 3,699,436 | 10/1972 | Shigematsu et al. .......... | 176/19 R X |
| 3,775,250 | 11/1973 | Scholz et al. ........................... | 176/87 |
| 3,779,865 | 12/1973 | Schafstall et al. ................. | 176/87 X |
| 3,862,578 | 1/1975 | Schluter ......................... | 176/19 R X |

*Primary Examiner*—Peter A. Nelson
*Attorney, Agent, or Firm*—Lane, Aitken, Dunner & Ziems

[57] ABSTRACT

A cylindrical shell or so-called reactor core basket is fitted with a coaxial and cylindrical bearing ring which is joined to a top flange of the core basket by means of radial struts and rests on an internal annular shoulder of the reactor vessel. Passageways between the bearing ring and the struts accommodate instruments for nondestructive testing of welded joints, the instruments being guided and displaced over the external face of the core basket in order to inspect the internal face of the reactor vessel without any need to remove reactor internals.

6 Claims, 5 Drawing Figures

INTERNAL STRUCTURE FOR A NUCLEAR REACTOR VESSEL

This invention relates to an internal structure for the pressure vessel of a nuclear reactor.

In more exact terms, the present invention is concerned with an improved mode of construction of the assembly for supporting the core of the nuclear boiler, said assembly being intended to perform the function of a thermal shield at the same time.

This structure applies in particular to the case of low-power pressurized water reactors, that is, in which the reactor core is of relatively light weight.

The reactor vessel is the pressurized chamber which contains the reactor core and in which the primary coolant water is circulated.

The vessel is constituted by a cylindrical body which is closed at the bottom by a welded bottom end and at the top by a removable lid or closure head which permits loading and unloading of the reactor core.

The diameter of the reactor vessel is larger than that of the core and the space left free is filled with primary water which forms a reflector and ensures cooling. A thermal shield formed of metallic shells serves to absorb part of the gamma radiation emanating from the reactor core.

The thickness of the walls of the reactor vessel is calculated in order to withstand the high pressures of the primary water.

A low-alloy steel is employed in the fabrication of the reactor vessels and resistance to corrosion produced by the circulation of the primary water under pressure is obtained by depositing a stainless steel layer on the internal walls.

Experience has shown that this vessel design ensures good resistance to temperature (between 280° and 300° centigrade) and to pressure (150 bar) of the primary fluid.

Inspections of the reactor vessel are carried out periodically. These inspections apply to the detection of defects or the development of existing defects both in welded joints between the different shells constituting the vessel and at the surface of the stainless steel covering.

These inspections are performed when the reactor core as well as the internal lining structure of the reactor vessel have been removed.

In particular, the disadvantage lies in the fact that the internal lining structure (biological shield and thermal shield) require a fairly long time of disassembly followed by re-assembly, accurate positioning and substantial equipment for handling and biological shielding, said biological shielding equipment being located above the internal lining structure.

Within the interior of the vessel, the cylindrical shell of the reactor core surrounds this latter and limits between said shell and the internal wall of the reactor vessel an annular space which extends from the support floor of the reactor core to the top of the reactor.

At the time of changing of the reactor core, the closure head is thus lifted as well as the top portion of the cylindrical shell and the top grid.

In accordance with this old form of construction, it is necessary to carry out the disassembly of the entire cylindrical shell in order to inspect the internal wall of the reactor vessel, for example.

The present invention is precisely directed to a nuclear reactor which permits inspection of the internal face of the reactor vessel without any need to disassemble and remove the internal portions of the vessel and therefore without any need to employ the biological shield equipment which surrounds the internal lining structure.

As a consequence, the boiler outage time is considerably reduced, thus permitting more competitive utilization of nuclear power in comparison with other forms of power.

Among other features, this form of reactor vessel makes it possible to carry out an inspection at each fuel change if necessary, which had hitherto proved impossible by reason of the fact that this would have resulted in outage of the nuclear boiler for an excessive length of time.

The nuclear reactor of the type comprising a vertical pressure vessel having a bottom end section and a top vessel closure head essentially comprises a cylindrical shell or so-called "core basket" which forms an annular space between said basket and said vessel, said cylindrical shell being provided with a bottom end-wall on which the reactor core rests and with a top flange, said shell being fitted with a cylindrical bearing ring which surrounds said flange and has the same axis as the core basket, said ring being joined to said flange by means of radial struts and intended to rest on an annular shoulder formed in the internal wall of said vessel, passageways being formed between said rings and said struts for testing instruments, and is distinguished by the fact that said shell is provided on the external face thereof with means for guiding and displacing said testing instruments.

Preferably, said core basket is closed at the top by a closure head fitted with a ring which is similar to the bearing ring of said basket and joined to said closure head by means of radial ribs, said closure head ring being intended to rest on the bearing ring of the basket.

In accordance with a first embodiment, said basket is provided on that face which is directed towards the vessel with a plurality of rails arranged in circles at right angles to the axis of said basket, said rails being capable of guiding a vertical column extending substantially up to the full height of said vessel, said column being capable of guiding in translational motion a moving system comprising a testing instrument which is directed towards the internal face of the vessel and means for displacing said moving system with respect to said column.

In this case, in order to carry out the testing operation, the core basket is fixed in position and the testing instrument is displaced.

In accordance with a second embodiment, the structure comprises a vertical guide rail fixed on the external face of said basket, said rail being capable of receiving a moving system comprising a testing instrument directed towards the internal face of said vessel and means for displacing said system along said rail, said basket being provided along the vertical axis thereof with a pivot-pin rigidly fixed to the bottom end of said shell, said pivot-pin being adapted to cooperate with a recess formed in the internal face of the bottom end of the vessel, said pivot-pin being capable of guiding said shell in vertical translational motion and in rotation about said vertical axis.

In the last-mentioned case, the displacement of the testing instrument is obtained by displacing the core basket itself in pivotal motion and thus in turn displacing the testing instrument.

A clearer understanding of the invention will in any case be gained from the following description of a number of embodiments of the invention which are given by way of example and not in any limiting sense, reference being made to the accompanying drawings, wherein.

Figure 1:
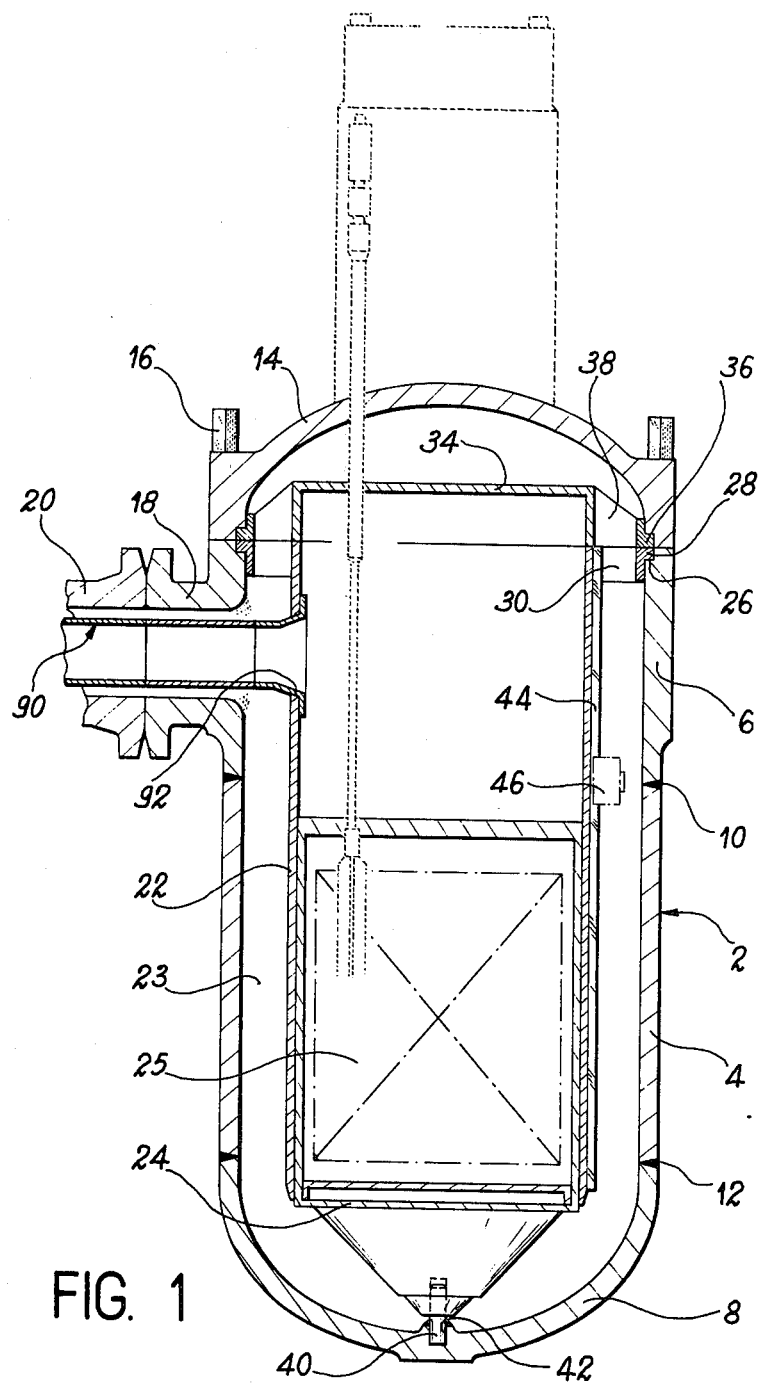
FIG. 1 is a vertical sectional view of the complete vessel of the nuclear boiler.

There is shown in FIG. 1 a vertical sectional view of the vessel 2 of a nuclear reactor having the internal structure in accordance with the invention.

The reactor vessel 2 is constituted by a cylindrical wall formed of a plurality of shells 4, 6 which are welded to each other and a domical end 8 which is also welded. The welded joints are designated by the reference numerals 10 and 12.

The vessel is closed at the top by a lid or so-called closure head 14 which is fixed in position by means of studs such as the stud 16. The vessel is also provided with nozzles such as the nozzle 18 to which the primary coolant ducts such as the duct 20 are connected.

Provision is made within the interior of the vessel 2 for a cylindrical shell 22 which surrounds the reactor core 25 and will hereinafter be designated as the core basket. The core basket 22 is fitted with a flooring element 24 which supports the reactor core 25. The flooring element 24 is pierced by orifices so as to permit the upward flow of primary coolant liquid. An annular space 23 is formed between the basket 22 and the wall of the reactor vessel.

In accordance with the present invention, the core basket is suspended from an annular shoulder 26 formed in the internal wall of the reactor vessel 2. The basket is suspended from the annular shoulder 26 by means of a support ring 28 which rests on the annular shoulder 26.

Figure 2:
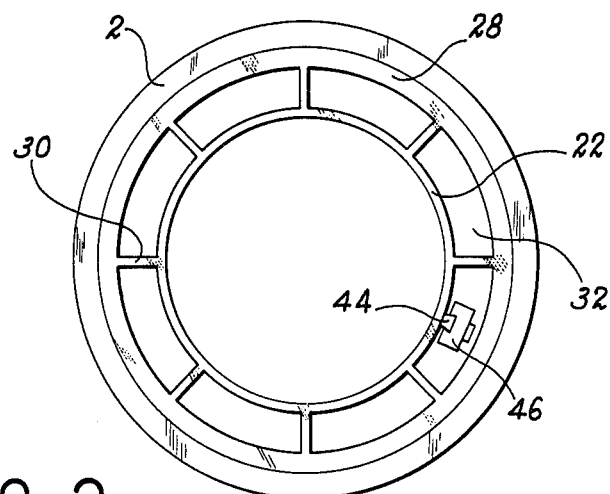
FIG. 2 is a top view showing only the top portion of the core basket.

The ring 28 is rigidly fixed to the upper end of the basket 22 by means of radial struts 30. Eight struts are shown in FIG. 2. Between the basket 22, the ring 28 and the struts 30, provision is made for wide passageways such as the passageway 32. The basket is surmounted by a grid 34 which is supported on the ring 28 by means of a second support ring 36 which is rigidly fixed to the grid by means of radial struts 38. As can readily be understood, the struts 30 and 38 coincide and the struts 38 define passageways which form extensions of the passageways 32. Finally, the flooring element 24 is fitted with an axial pivot-pin 40 which cooperates with a recess 42 formed in the end-wall 8 of the vessel. The pivot-pin also permits guiding in vertical translational motion over a short distance as will hereinafter be explained.

It is therefore apparent that, by virtue of the particular structure of the core basket 22, direct access to the annular space 23 is provided by means of the passageways 32 (after removal of the closure head 14).

This possibility is utilized in order to carry out tests on the vessel and especially ultrasonic tests.

In accordance with a first alternative embodiment, the core basket 22 is provided on its external face and up to its full height with a vertical rail 44 for translational guiding of a testing instrument 46 of the ultrasonic type, for example. The displacement of the instrument is obtained for example by means of an assembly comprising a toothed rack (rail 44) and a toothed wheel (mounted on the instrument). The testing instrument 46 can thus be displaced downwards with respect to the reactor vessel. It is possible in particular to bring the instrument opposite to the welded joints 10 and 12. In this alternative embodiment, the core basket can be lifted to a slight extent in order to be detached from the reactor vessel 2 and displaced in rotation about the pivot-pin 40. It is understood that, during its movement, the core basket drives the testing instrument 46 in a circular movement and thus enables this latter to inspect all the welded joints 10 and 12 in succession.

Lifting and pivotal motion of the core basket is obtained by a machine 50 which is intended to be placed above the reactor vessel 2 after the closure head 14 has been removed. This machine comprises a frame 52 which rests for example on the rim of the vessel by means of four legs such as those designated by the reference 54. Each leg can be fixed on the vessel by means of screws such as 56 which are engaged in the bores corresponding to the fixing studs of the closure head. The machine comprises a first moving system 58 constituted by four supporting arms such as the arm 60 terminating in yokes which are closely fitted over the struts 30. The connection between the yokes 62 and the struts 30 can be obtained by means of pins such as 64 which are introduced in bores formed on the one hand in the yokes 62 (holes 66) and on the other hand in the struts 30 (holes 68). A rigid connection is thus formed between the core basket and the moving system 58.

The supporting arms 60 are rigidly fixed to a vertical rod 70, the upper end of which rests on ball-bearings 74. The ball-bearings 74 are secured to a second moving system 76 which is capable of vertical sliding motion within the frame 52. A motor 78 for driving a pinion 80 in rotation is mounted within the interior of the system 76 in rigidly fixed relation to this latter. The pinion 80 is disposed in meshing engagement with a second pinion 82 which is keyed on the rod 70. Thus, by means of the motor 78, the rod 70 can be driven in rotation about a vertical axis.

The moving system 76 is clearly provided in addition with bearings 84 for guiding the rod 70. The moving system 76 can be driven in vertical translational motion with respect to the frame 52 by means of a worm-rack system 86.

It can therefore be understood that this device makes it possible in a first stage to initiate lifting of the core basket with respect to the reactor vessel by means of the rack-and-pinion assembly (the vessel being guided by the pivot-pin 40) and then, in this position, to subject the basket to a movement of rotation about its vertical axis. It is apparent that the core basket is guided by the pivot-pin 40 during this movement of rotation.

In order to permit rotation of the basket 22, it is necessary to disconnect the duct 90 from the basket 22. In fact, the nozzle 18 and the outer duct 20 are provided internally with a duct which is designated by the general reference 90. This inner duct opens directly into the bore 92 at the top of the core basket. Said inner duct serves to convey "hot" water discharged from the reactor core towards the heat exchangers and the primary pumps.

Figure 4:
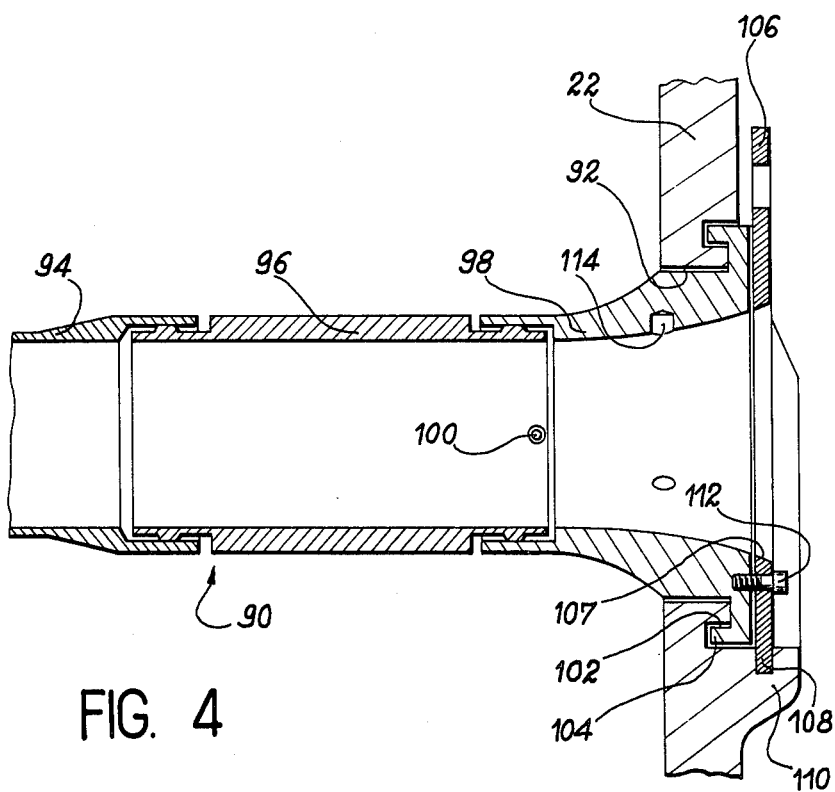
FIG. 4 is a vertical sectional view of a machine which is capable of lifting the core basket.
Figure 3:
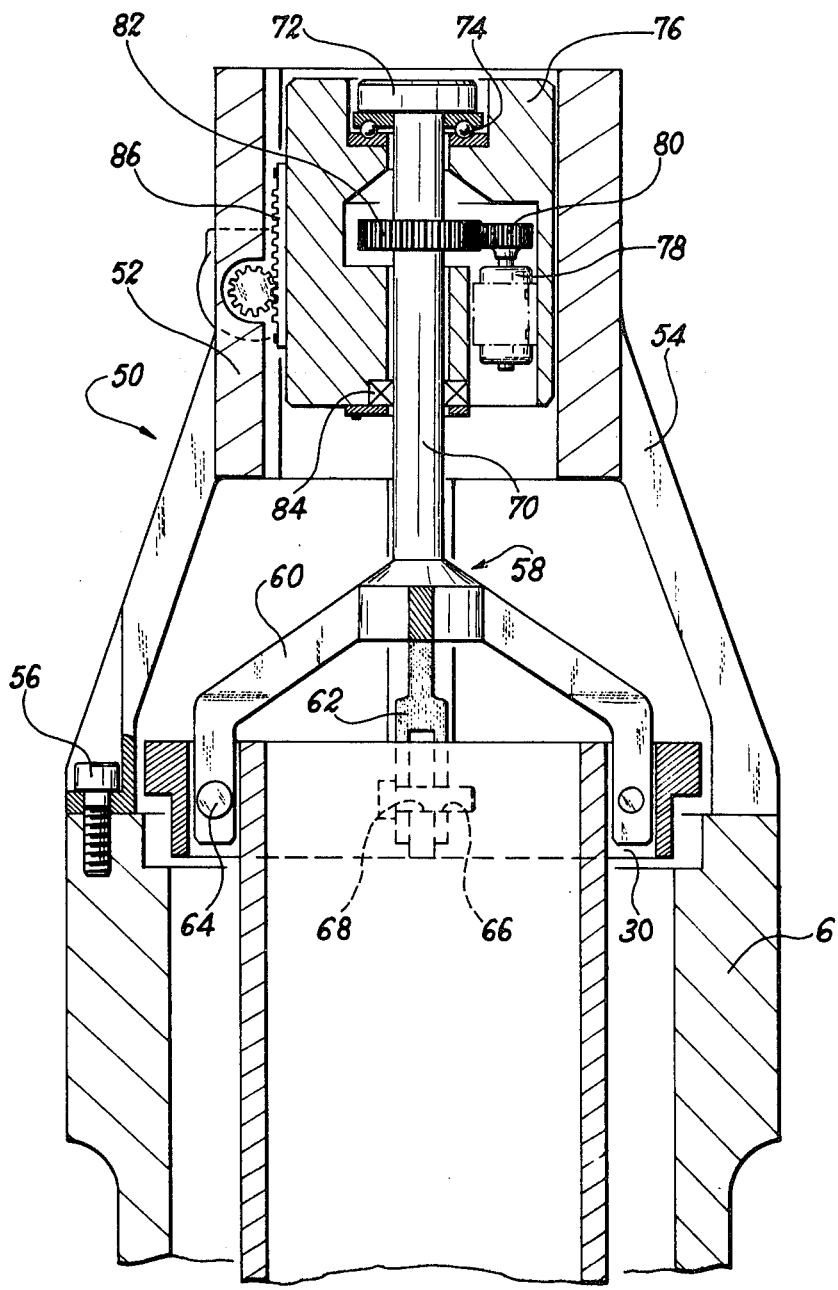
FIG. 3 is a vertical sectional view showing a mode of connection between the "hot" water discharge duct and the core basket.

There is shown in FIG. 4 one embodiment of the connection between the inner duct 90 and the core basket 22. The duct 90 is constituted by a duct element 94 extended by a pipe 96 and said pipe in turn opens into a suction sleeve 98 which is connected directly to the core basket 22 at the level of the bore 92.

The sleeve-type connections between the suction sleeve 98, the pipe 96 and the duct element 94 permit of free displacement of the pipe 96 under the action of thermal expansions. The pipe 96 and the sleeve 98 are coupled together by means of the cross-pin 100. A rigid connection between the suction sleeve 98 and the core basket 22 is ensured by means of the groove 102 which is formed in the wall of the core basket around the bore 92 and cooperates with the re-entrant flange 104 which forms an extension of said sleeve. In order to lock the sleeve in position with respect to the core basket, provision is made for a so-called "guillotine-plate" 106 which is capable of sliding within a groove 108 formed in the semi-circular flange of the core basket at the level of the bore 92. It is apparent that, when the plate 106 is introduced into said groove, said plate locks the sleeve 98 translationally with respect to the core basket 22. Pins such as 112 serve to lock the plate 106 in position with respect to the sleeve 98. The plate 106 is obviously provided with a bore 107 which forms an extension of the suction sleeve 98 when the plate 106 is in position.

When it is desired to lift the core basket, the initial operation clearly consists in disconnecting the inner duct 90 from the core basket. To this end, the pins 112 are withdrawn and the plate 106 is removed. This has the effect of uncoupling the sleeve which can be introduced together with the pipe 96 into the interior of the core basket by means of a gripping instrument (not shown) which engages within the holes 114 formed in the internal face of the sleeve 98 and this assembly is withdrawn from the reactor vessel.

Figure 5:
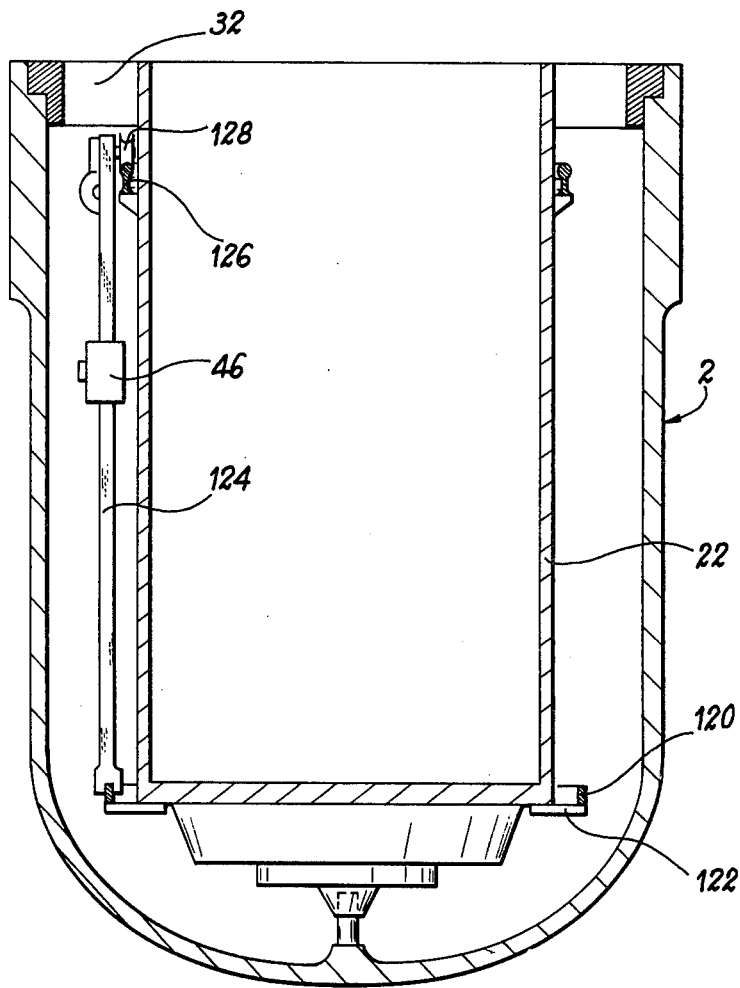
FIG. 5 is a partial vertical sectional view showing a second mode of guiding of the testing instrument.

In FIG. 5, there is shown an alternative embodiment of the core basket 22 which permits inspection of all the welds of the reactor vessel without entailing the need to carry out lifting and pivotal displacement of the core basket 22.

In this alternative embodiment, the design of the core basket and the method adopted for supporting this latter are identical with those illustrated in FIGS. 1 and 2. The only difference concerns the means adopted for guiding the weld-testing instrument 46. In this alternative form, the core basket 22 is provided at its lower end with a peripheral circular rail 120 which is rigidly fixed to the core basket by means of ribs such as those designated by the reference 122. The inspection and testing instrument 46 is mounted on a column 124 which is introduced into the annular space 23 through the passageways 32. The column 124 is supported at its lower end on the rail 120 and guided by this latter at its lower end. The column can also be guided by a second circular rail 126 which is fixed on the periphery of the reactor core near the upper end of this latter. For example, a grooved wheel such as the wheel 128 which is attached to the upper end of the column 124 runs along the rail 126.

The inspection instrument 46 is of course also provided with means (not shown) for displacing the instrument along the column 124. By means of the rails 122 and 128, it is possible to displace the column 124 around the entire core basket 22; the inspection instrument 46 thus moves in front of all the welded joints of the reactor vessel 2.

It is therefore apparent that this particular mode of support of the core basket permits easy inspection of the internal face of the vessel and in particular of the welded joints formed between the different shells which constitute said vessel.

What we claim is:

1. A nuclear reactor into which testing instruments can be introduced, comprising a vertical pressure vessel having a bottom end section and a top vessel closure head with an internal lateral face therebetween, a reactor core and a core basket within said pressure vessel, said core basket having the shape of a vertical cylindrical shell having a vertical axis and provided with a btoom end wall on which the reactor core rests, the core basket further including an external lateral face and a top flange, an annular space being provided between said pressure vessel and said core basket, said core basket being fitted with a cylindrical bearing ring which surrounds said top flange and has the same axis as the core basket, radial struts joining said ring to said top flange, said ring resting on an annular shoulder formed in the internal lateral face of said vessel, passageways being formed between said top flange, said bearing ring and said struts, said passageways being wide enough to introduce the testing instruments, said passageways being placed above said annular space and providing a direct access to said annular space, the external lateral face of said core basket being provided with means for guiding and displacing said testing instruments.

2. A reactor according to claim 1, wherein said core basket is closed at the top by a closure head fitted with a ring which is similar to the bearing ring of said basket and joined to said closure head by means of radial ribs, said closure head ring being sized and shaped to rest on the bearing ring of the basket.

3. A reactor according to claim 1, and further including a vertical column extending substantially up to the full height of the vessel, said basket being provided on that face which is directed towards the vessel with a plurality of rails arranged in circles at right angles to the axis of said basket for guiding said vertical column, a moving system mounted for movement on the column, said moving system comprising a testing instrument which is directed towards the internal face of the vessel, and means for displacing said moving system with respect to said column.

4. A nuclear reactor of the type comprising a vertical pressure vessel having a bottom end section and a top vessel closure head and an internal structure, wherein said reactor comprises a core basket in the shape of a vertical cylindrical shell which forms an annular space between said basket and said vessel, said core basket being provided with a bottom end-wall on which the reactor core rests and with a top flange, said core basket being fitted with a cylindrical bearing ring which surrounds said flange and has the same axis as the core basket, said ring being joined to said flange by means of radial struts and being sized and shaped to rest on an annular shoulder formed in the internal wall of said vessel, passageways being formed between said rings and said struts for testing instruments, and wherein said shell is provided on the external face thereof with means for guiding and displacing said testing instruments, said reactor further comprising a vertical guide rail fixed on the external face of said basket, a moving system mounted on the rail, the moving system comprising a testing instrument directed towards the internal face of said vessel and means for displacing said system along said rail, and wherein said basket is provided along the vertical axis thereof with a pivot-pin rigidly fixed to the bottom end of said shell, said pivot-pin cooperating with a recess formed in the internal face of the bottom end of the vessel, said pivot-pin operating to guide said shell in vertical translational motion and in rotation about said vertical axis.

5. A reactor according to claim 4, wherein said basket is provided at the upper end with means for securing to a machine designed to initiate lifting and rotational displacement of said shell after removal of the closure head of the reactor vessel.

6. A reactor according to claim 4, wherein said core basket is closed at the top by a closure head fitted with a ring which is similar to the bearing ring of said basket and joined to said closure head by means of radial ribs, said closure head ring being sized and shaped to rest on the bearing ring of the basket.

* * * * *